United States Patent [19]

Ishida

[11] Patent Number: 5,583,915
[45] Date of Patent: Dec. 10, 1996

[54] DIGITAL RADIO TELEPHONE APPARATUS HAVING AUTOMATIC ANSWERING/RECORDING FUNCTIONS

[75] Inventor: Shinjiro Ishida, Iruma, Japan

[73] Assignee: Casio Computer Co., Ltd., Tokyo, Japan

[21] Appl. No.: 365,150

[22] Filed: Dec. 28, 1994

[30] Foreign Application Priority Data

Dec. 29, 1993 [JP] Japan .................................... 5-349975

[51] Int. Cl.⁶ .................................................. H04Q 7/38
[52] U.S. Cl. .................. 379/58; 379/61; 379/88
[58] Field of Search ................... 370/29.1, 95.1; 379/52, 56, 58, 60, 61, 67, 87, 88, 90; 455/33.1, 33.4, 71, 89

[56] References Cited

U.S. PATENT DOCUMENTS

| | | | |
|---|---|---|---|
| 4,881,259 | 11/1989 | Scordato | 379/58 |
| 5,029,198 | 7/1991 | Walpole et al. | 379/88 |
| 5,159,596 | 10/1992 | Itoh | 370/95.1 |
| 5,220,594 | 6/1993 | Ohnishi et al. | 379/61 |
| 5,327,481 | 7/1994 | Horimoto | 379/58 |
| 5,333,176 | 7/1994 | Burke et al. | 379/58 |
| 5,416,779 | 5/1995 | Barnes et al. | 370/29.1 |

OTHER PUBLICATIONS

IEEE Standard Dictionary of Electrical and Electronics Terms, pp. 111 and 112, 1984.

*Primary Examiner*—William Cumming
*Attorney, Agent, or Firm*—Frishauf, Holtz, Goodman, Langer & Chick

[57] ABSTRACT

When an incoming call is received via a telephone line in an automatic answering/recording mode, a response message stored in a recording memory is read out by a burst signal processing section at the timing of expansion processing for restoration of reception speech data, and a message sent from a caller is written in the recording memory at the timing of compression processing for generation of transmission speech data, thereby providing a simple digital radio telephone apparatus capable of performing a simultaneous answering/recording operation.

3 Claims, 5 Drawing Sheets

DIGITAL RADIO TELEPHONE APPARATUS HAVING AUTOMATIC ANSWERING/RECORDING FUNCTIONS

BACKGROUND OF THE INVENTION

1. Field of the Invention

The present invention relates to a digital radio telephone apparatus such as a digital cordless telephone apparatus or a digital portable telephone apparatus designed to perform bidirectional speech transmission via a radio channel according to a digital scheme and, more particularly, to a digital radio telephone apparatus having a recording/reproducing function.

2. Description of the Related Art

Recently, a PHP (Personal Handy Phone) system has been developed to be put into practice. In this system, bidirectional speech transmission between a base unit and each of portable units (portable hand set) via a radio channel is performed according to the digital scheme, and each portable unit can be used outdoors like an existing portable telephone apparatus when a digital cordless telephone apparatus of the PHP system is used indoors, both the base and portable units can be used to perform speech communication in the same manner as an existing cordless telephone apparatus. This apparatus is used outdoors in the following manner. For example, a large number of radio base stations (corresponding to radio base stations for portable telephone apparatuses) are installed in public telephone booths distributed in a town, and each station is connected to a public telephone line. With this arrangement, each radio station is regarded as the base unit of a cordless telephone so that speech communication can be performed by using a portable unit even in a place outside the home.

A recording/reproducing function provided to a conventional analog cordless telephone apparatus is expected to be added to the above digital cordless telephone apparatus. As is apparent, for example, a recording/reproducing function for performing a so-called simultaneous answering/recording operation is expected to be added to the digital cordless telephone apparatus. The simultaneous answering/recording operation is an operation of recording a speech signal generated by a caller, in performing an automatic answering/recording operation, simultaneously with reproduction of a response message from the user upon reception of an incoming call. First of all, in order to add the recording/reproducing function for such a simultaneous answering/recording operation to the above digital cordless telephone apparatus, the corresponding arrangement applied to an existing analog cordless telephone apparatus may be directly used. That is, a response message storing IC memory, a speech communication recording IC memory or a tape recorder, and a speech codec circuit for reading/writing speech data in/from the IC memory, which are used for the existing analog cordless telephone apparatus, may be incorporated in the digital cordless telephone apparatus.

If, however, a circuit for reproducing a response message to perform a simultaneous answering/recording operation, and a circuit for recording/reproducing a message from a caller are independently arranged in the apparatus, the circuit size is increased. As a result, problems are posed in terms of the size and cost of the apparatus.

SUMMARY OF THE INVENTION

It is an object of the present invention to provide a digital radio telephone apparatus which can record and reproduce a response or outgoing message and an incoming message from a caller without special circuits for recording and reproducing operations.

According to the present invention, there is provided a digital radio telephone apparatus having a recording function, which performs bidirectional speech transmission via a radio channel according to a digital scheme, comprising a burst signal processing section for generating a transmission burst signal by performing compression processing of transmission speech data at predetermined time intervals, and restoring reception speech data by performing expansion processing of a burst signal received at a timing different from a transmission timing for the transmission burst signal, and a recording memory for storing a response message for an automatic answering/recording operation and a message from a caller, wherein the burst signal processing section causes an expansion processing circuit to reproduce the response message stored in the recording memory when the reception speech data is restored, and also causes a compression processing circuit to record the message from the caller when the transmission speech data is generated.

According to the present invention, the bust signal processing section essentially included in the digital radio telephone apparatus causes the expansion processing circuit to reproduce a response message from the user, which is stored in the recording memory, when reception speech data is restored, and also causes the compression processing circuit to record a message from a caller when transmission speech data is generated with this arrangement, the timing of reproduction of a response message is different from the timing of recording of a message from a caller. Therefore, a simultaneous answering/recording operation can be performed without special recording and reproducing circuits. This leads to simplification of the circuit of the digital radio telephone apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described in detail below with reference to the accompanying drawings.

An embodiment in which the present invention is applied to the base unit of a digital cordless telephone apparatus (PHP) will be mainly described. Another embodiment in which the present invention is applied to each portable unit of the digital cordless telephone apparatus will also be described.

Figure 1:
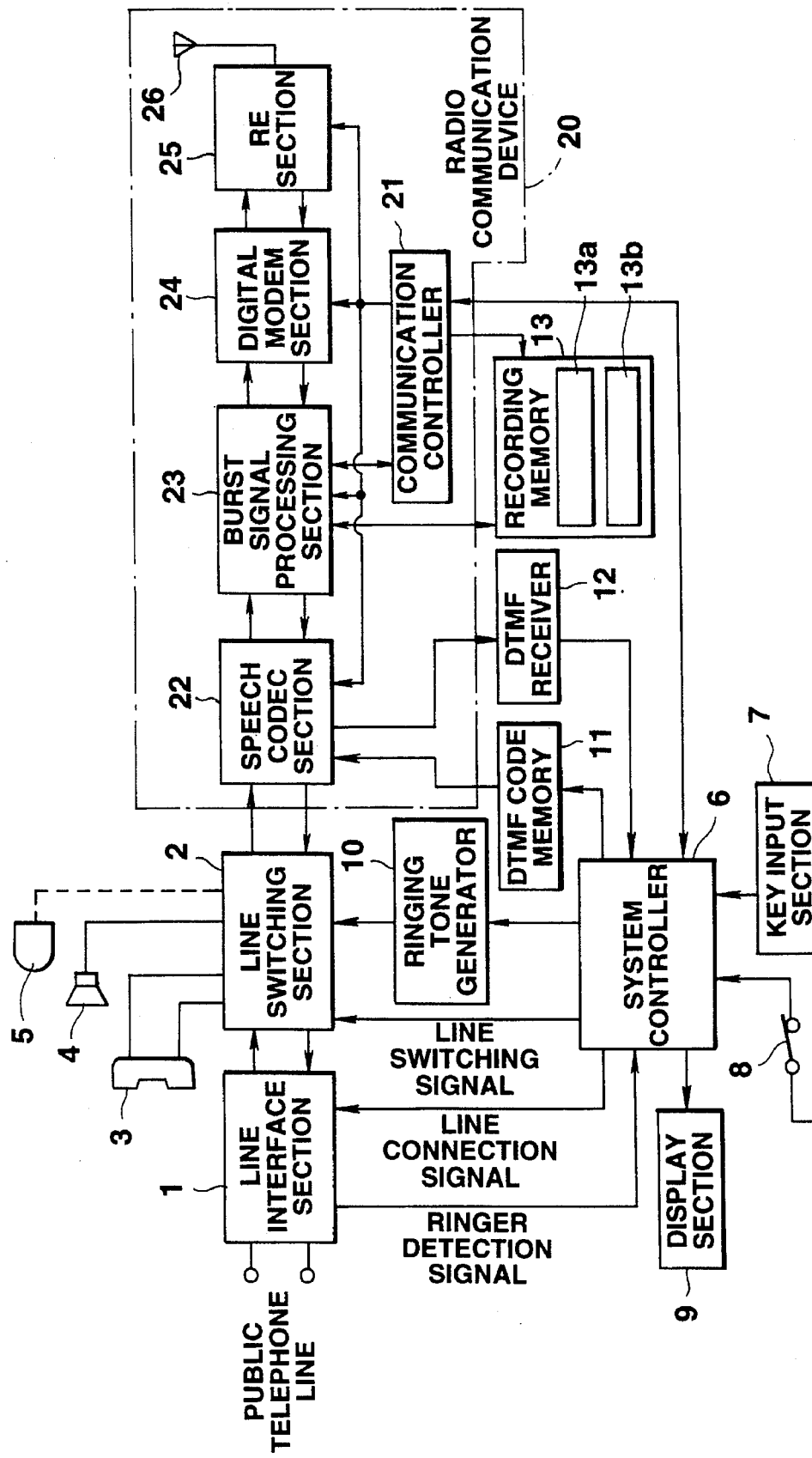
FIG. 1 is a block diagram showing the hardware arrangement of a digital cordless telephone apparatus according to the first embodiment of the present invention.

FIG. 1 is a block diagram showing the overall hardware arrangement of the base unit of the digital cordless telephone apparatus to which the arrangement of the present invention is applied. As shown in FIG. 1, the base unit of the digital cordless telephone apparatus is constituted by a line interface section 1, a line switching section 2, a handset 3, a loudspeaker 4, a microphone 5, a system controller 6, a key input section 7, a hook switch 8, a display section 9, a ringing tone generator 10, a DTMF (Dual Tone Multiple Frequency) code memory 11, a DTMF receiver 12, a recording memory 13, and a radio communication device 20. The radio communication device 20 is constituted by a communication controller 21, a speech codec section 22, a burst signal processing section 23, a digital modem section 24, an RF (Radio Frequency) section 25, and an antenna 26.

In this case, the line interface section 1 performs an interface operation between the base unit of the digital cordless telephone apparatus and a public telephone line. When, for example, a phone call is received from an outside wire, the line inter-face section 1 receives a ringer signal from the outside wire and supplies a ringer detection signal to the system controller 6. In contrast to this, when a line connection signal is supplied from the system controller 6, the line interface section 1 turns the internal line switch on to connect a line with this line connection, a speech signal generated by a caller and sent via an outside wire is supplied to the line switching section 2 (the above procedure is reversed when a phone call is to be made). The line switching section 2 switches the following operations in accordance with the type of a line switching signal supplied from the system controller 6: the operation of supplying a speech signal generated by a caller and received from the line interface section 1 to the handset 3; and the operation of supplying the speech signal to the recording memory 13 or a portable unit (not shown) via the radio communication device 20. In addition, the line switching section 2 switches the following operations in accordance with the type of the above line switching signal: the operation of supplying a ringing tone signal generated by the ringing tone generator 10 to the loudspeaker 4; the operation of supplying a speech signal generated by a caller and supplied from the recording memory 13 via the radio communication device 20 to the loudspeaker 4 or the like; and the operation of supplying a response message from the user, which is input via the microphone 5 or the like, to the recording memory 13 via the radio communication device 20.

The system controller 6 controls the overall base unit of the digital cordless telephone apparatus. Assume that the current operation mode of the apparatus is a speech communication mode of allowing the user to directly receive a phone call from an outside wire. In this case, upon reception of a ringer detection signal from the line interface section 1, the system controller 6 controls the ringing tone generator 10 to generate a ringing tone signal, and supplies the line switching section 2 with a line switching signal for causing the loudspeaker 4 to generate a ringing tone in accordance with the generated ringing tone signal when the handset 3 is picked up by the user and the hook switch 8 is turned off, the system controller 6 supplies a line connection signal to the line interface section 1 to connect a line. In addition, the system controller 6 supplies the line switching section 2 with a line switching signal for causing the handset 3 to output speech in accordance with a speech signal generated by the caller.

Assume that the current operation mode of the apparatus is an automatic answering/recording mode of recording speech signal data from an outside wire in the absence of the user. In this case, upon reception of a ringer detection signal from the line interface section 1, the system controller 6 immediately supplies a line connection signal to the line interface section 1 to connect a line, and simultaneously performs control via the communication controller 21 to supply response message data (to be described later) stored in a response message memory area 13a of the recording memory 13 to the burst signal processing section 23 of the radio communication device 20. At the same time, the system controller 6 supplies the line switching section 2 with a line switching signal for supplying a speech signal generated by the caller, which is received upon the line connection, to the speech codec section 22 of the radio communication device 20.

Note that the following operation modes are prepared for the apparatus in addition to the above speech communication mode and automatic answering/recording mode: a registration mode of registering a response message in the response message memory area 13a of the recording memory 13; and a reproduction mode of reading out and reproducing speech signal data from a caller, which is written in a reception message memory area 13b of the recording memory 13 when the apparatus is set in the registration mode, the system controller 6 supplies the line switching section 2 with a line switching signal for supplying a response message from the user, which is input via the microphone 5 or the like, to the speech codec section 22 of the radio communication device 20. When the apparatus is set in the reproduction mode, the system controller 6 performs control via the communication controller 21 to read out speech signal data from a caller, which is written the reception message memory area 13b of in the recording memory 13, to the burst signal processing section 23 of the radio communication device 20. Assume that the apparatus is set in the speech communication mode. In this case, when the user operates the key input section 7 to make a phone call, the system controller 6 causes the display section 9 to display a telephone number input through the key input section 7, and supplies a key code corresponding to the telephone number to the DTMF code memory 11. In addition, the system controller 6 performs control to supply a digital DTMF code corresponding to the key code to the speech codec section 22 of the radio communication device 20.

Note that setting of each of these operation modes is performed by the operation of the key input section 7 by the user, input of a key code from the communication controller 21 of the radio communication device 20, and input of a key code obtained when the DTMF receiver 12 receives an analog DTMF code supplied from the speech codec section 22.

The radio communication device 20 serves to perform bidirectional speech transmission with respect to the portable units of the digital cordless telephone apparatus via radio channels according to the digital scheme. In the radio communication device 20, the communication controller 21 performs synchronous control of the speech codec section 22, the burst signal processing section 23, the digital modem section 24, and the RF section 25 in accordance with timing control data supplied from the system controller 6 with this synchronous control, transmission/reception of speech information between the base unit and the portable units (a maximum of four portable units) can be performed by a 4-channel TDMA/TDD scheme (4-channel time-division multiple access/time-division duplex scheme) using a single carrier wave.

Assume that the base unit of the digital cordless telephone apparatus is to transmit speech information to a portable unit. In this case, first of all, the speech codec section 22 generates transmission speech data by coding a speech signal from the caller, which is supplied from the line switching section 2, in real time according to the ADPCM (Adaptive Difference Pulse Code Modulation) scheme. The burst signal processing section 23 then generates a transmission burst signal by performing compression processing of the generated transmission speech data at predetermined time intervals (to be described in detail later). In addition, the digital modem section 24 modulates the generated transmission burst signal by the $\pi/4$-shift QPSK scheme ($\pi/4$-shift quadrature phase shift keying scheme). Finally, the RF section 25 frequency-converts the modulated transmission burst signal into a predetermined carrier wave and amplifies it. With this operation, the digital speech information can be transmitted to the portable unit in a predetermined time slot via the antenna 26.

when the base unit of this digital cordless telephone apparatus is to receive speech information transmitted from a portable unit according to the same principle as that described above, the RF section 25 performs high-frequency amplification of a signal input from the antenna 26 in a time slot different from a time slot used for transmission from the portable unit to the base unit, and frequency-converts the input signal into a predetermined baseband. The digital modem section 24 then demodulates the frequency-converted signal into a reception burst signal by the $\pi/4$-shift QPSK scheme. In addition, the burst signal processing section 23 performs expansion processing of the demodulated reception burst signal to restore the signal to received speech data. Finally, the speech codec section 22 decodes the restored received speech data in real time by the above ADPC scheme. As a result, the speech information transmitted from the portable unit is converted into an analog speech signal and supplied to the line switching section 2.

In addition to the above control, the communication controller 21 performs control to add a header indicating the type and the like of a transmission burst signal to each transmission burst signal generated in each predetermined time slot by the burst signal processing section 23, and extract a header added to a reception burst signal, demodulated by the digital modem section 24, from the RF section 25 so as to supply the header to the system controller 6. Furthermore, the communication controller 21 supplies a key code for setting an operation mode, which is supplied from the portable unit via the antenna 26, the RF section 25, the digital modem section 24, and the burst signal processing section 23, to the system controller 6.

The speech codec section 22 codes a response message from the user and a message (speech signal) from a caller, which are supplied from the line switching section 2 and the like under the control of the system controller 6, and supplies the coded response message data and the coded speech signal data to the burst signal processing section 23. In addition, the speech codec section 22 decodes response message data and speech signal data, which are supplied from the recording memory 13 to the burst signal processing section 23 under the control of the system controller 6 and the communication controller 21, and supplies the decoded response message and the decoded speech signal to the line switching section 2 and the like. Furthermore, the speech codec section 22 supplies an analog DTMF signal for setting an operation mode, which is supplied from an outside wire via the line interface section 1, to the DTMF receiver 12.

Figure 2:
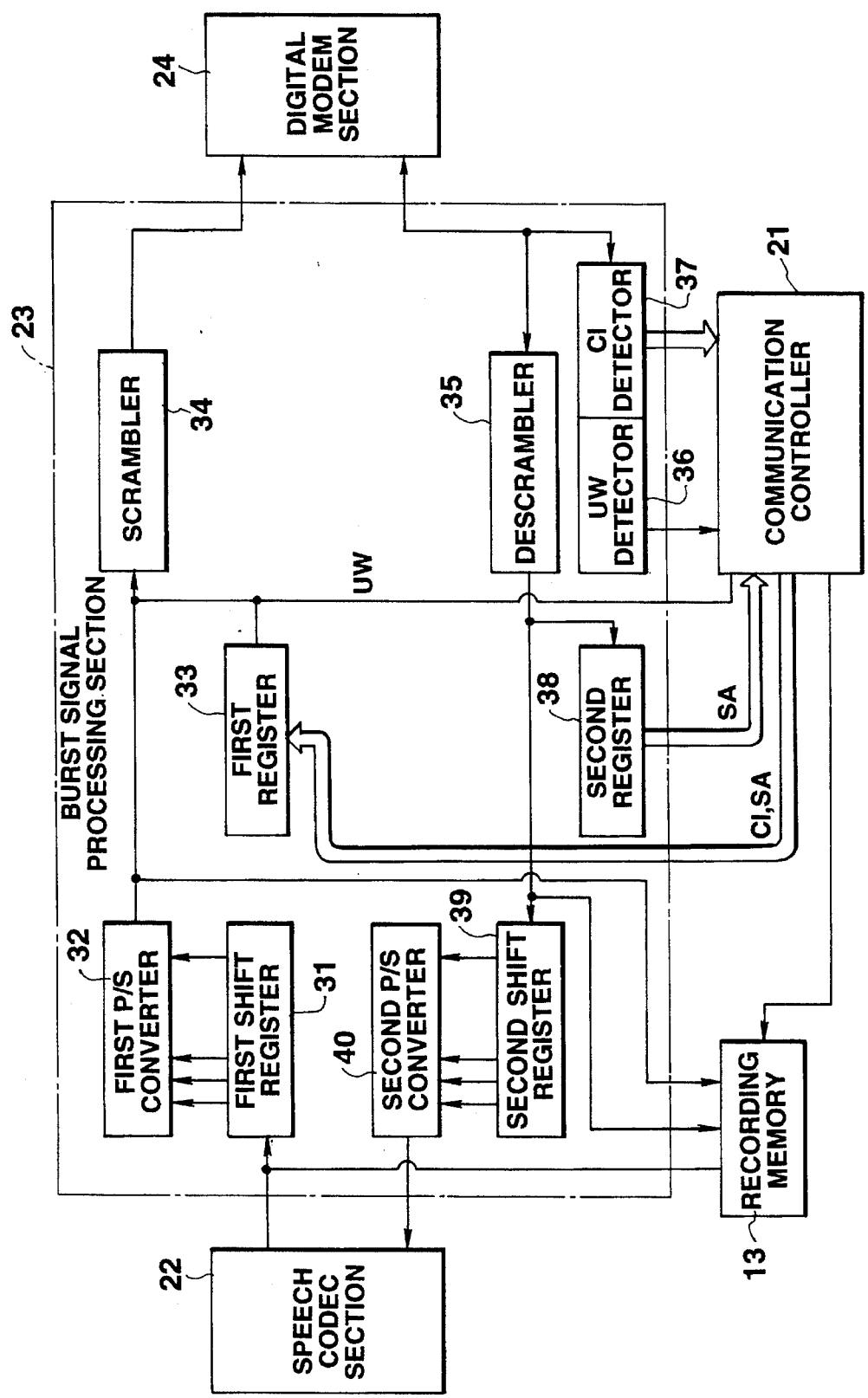
FIG. 2 is a block showing the actual hardware arrangement of a burst signal processing section in FIG. 1.
Figure 3:
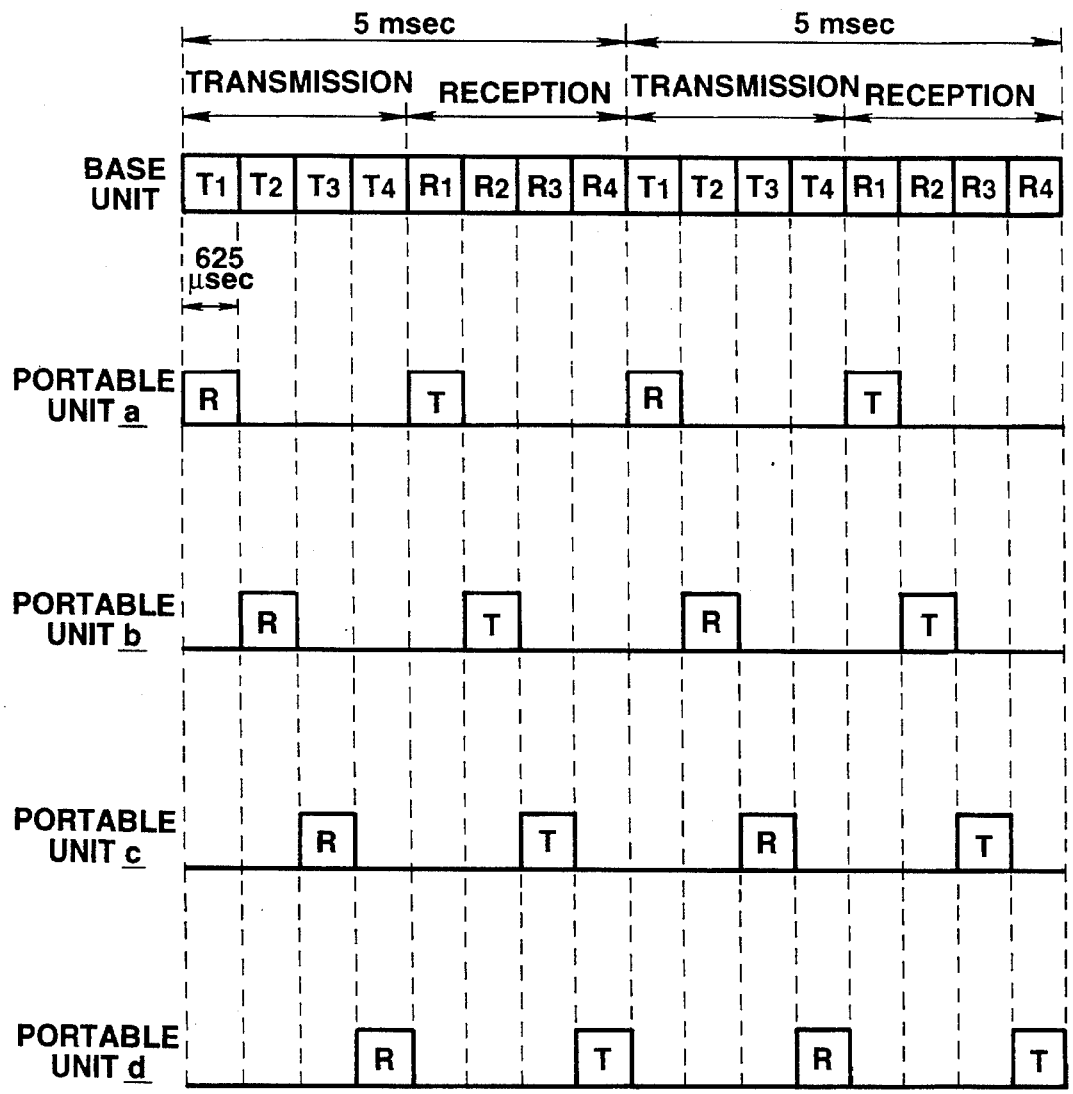
FIG. 3 is a chart showing the slot arrangement of a 4-channel TDMA/TDD scheme realized by the burst signal processing section shown in FIG. 1.

FIG. 2 is a block diagram showing the actual hardware arrangement of the burst signal processing section 23 in FIG. 1. FIG. 3 is a chart showing the slot arrangement of a 4-channel TDMA/TDD scheme realized by the burst signal processing section 23 in FIG. 1. As shown in FIG. 2, the burst signal processing section 23 is constituted by a first shift register 31, a first P/S converter (parallel/serial converter) 32, a first register 33, a scrambler 34, a descrambler 35, a unique word detector (to be referred to as a UW detector hereinafter) 36, a channel type detector (to be referred to as a CI detector hereinafter) 37, a second register 38, a second shift register 39, and a second P/S converter 40.

The first shift register 31 sequentially stores serial transmission speech data supplied from the speech codec section 22 in real time, and supplies the serial transmission speech data in a parallel state to the first P/S converter 32. The first P/S converter 32 converts the parallel transmission speech data supplied from the first shift register 31 into serial transmission speech data at high speed and supplies it to the scrambler 34. That is, the transmission speech data supplied from the speech codec section 22 is compressed on the time axis by the first shift register 31 and the first P/S converter 32.

The first register 33 stores CI (channel type) data indicating the type of data (indicating speech data in this case) and SA (exactly SACCH; additional slow control channel) data for transmission of slow packet data supplied from the communication controller 21, to add these data to the head portion of transmission speech data, obtained by the first P/S converter 32 upon compression processing, in the scrambler 34. The communication controller 21 supplies the scrambler 34 with a header including a UW (unique word) indicating the start portion of the transmission speech data. As a result, in the scrambler 34, the transmission speech data to which the header including the UW, the CI data, and the SA data are sequentially added is obtained. Subsequently, CRC (cyclic redundancy check) data for a parity check and the like are added to the last portion of the transmission speech data in this state, thereby generating a transmission burst signal of a transmission rate of 240 bits/625 μsec.

Referring to FIG. 3, a transmission burst signal (corresponding to a slot $T_1$, $T_2$, $T_3$, or $T_4$) of 625 μsec corresponding to ⅛ the duration of transmission speech data of five msec is generated from the transmission speech data by the burst signal processing section 23. Subsequently, this transmission burst signal is transmitted to one of the four portable units a, b, c, or d via the digital modem section 24, the RF section 25, and the antenna 26 under the control of the communication controller 21.

A reception burst signal (corresponding to a slot $R_1$, $R_2$, $R_3$, or $R_4$) supplied from the digital modem section 24 is supplied to the descrambler 35, the UW detector 36, and the CI detector 37. The descrambler 35 supplies reception speech data, obtained by removing a header including Uw and CI, SA, and CRC data from the reception burst signal, to the second shift register 39. The UW detector 36 and the CI detector 37 respectively detect the UW and the CI data and supply them to the communication controller 21. The second register 38 supplies the SA data removed by the descrambler 35 to the SA data to the communication controller 21 independently. In this case, the type of reception speech data, the start portion of the reception speech data, and the contents of the packet data are respectively recognized by the system controller 6 from the CI data, the UW data, and the SA data supplied from the communication controller 21.

The second shift register 39 sequentially stores fast serial reception speech data supplied from the descrambler 35. When the reception speech data is completely stored, the second shift register 39 supplies the serial reception speech data in a parallel manner to the second P/S converter 40. The second P/S converter 40 converts the fast parallel reception speech data supplied from the second shift register 39 into slow serial reception speech data and supplies it to the speech codec section 22. That is, the second shift register 39 and the second P/S converter 40 serve to expand reception speech data signal of 240 bits/625 μsec, supplied from the descrambler 35, on the time axis. As a result, the reception burst signal supplied from the digital modem section 24 is converted into reception speech data of a transmission rate which allows decoding by the speech codec section 22.

Note that the data having undergone compression processing and obtained by the first P/S converter 32 is written in the recording memory 13 under the control of the communication controller 21. Data read out from the recording memory 13 under the control of the communication controller 21 is supplied to the first shift register 31 and the second shift register 39 and output to the loudspeaker 4 of the portable or base unit or an outside wire.

The operation of the base unit of the digital cordless telephone apparatus having the above arrangement will be described next. An operation to be performed to set an operation mode in this digital cordless telephone apparatus and the operations of the registration mode and the automatic answering/recording mode after the operation mode setting operation will be described below.

An operation mode in this digital cordless apparatus is set through the key input section 7, an outside wire, or a portable unit. More specifically, in setting an operation mode through the key input section 7, the user operates a mode key (not shown) of the key input section 7 to select a desired operation mode, and the system controller 6 discriminates the operation mode selected by the user. In setting an operation mode through an outside wire, the user operates the push buttons (not shown) of a public telephone set (not shown) connected to the outside wire to designate a desired operation mode with a password. An analog DTMF signal for setting the operation mode designated by the user is then supplied to the DTMF receiver 12 via the line interface section 1, the line switching section 2, and the speech codec section 22. When a key code corresponding to the DTMF signal is supplied from the DTMF receiver 12 to the system controller 6, the system controller 6 discriminates the operation mode indicated by the key code. In setting an operation mode through a portable unit, the user operates a mode key (not shown) of a key input section (not shown) of the portable unit to set the operation mode in the same manner as described above.

Assume that the apparatus is set in the registration mode. In this case, the system controller 6 supplies a line switching signal to the line switching section 2 to supply a response message input by the user through the microphone 5 to the speech codec section 22. In addition, the system controller 6 performs control to code the response message supplied to the speech codec section 22 into response message data and supply it to the burst signal processing section 23. Furthermore, the system controller 6 performs control (to be described in detail later) to write the response message data, which is to be compressed by the first shift register 31 and the first P/S converter 32 of the burst signal processing section 23, at a predetermined address in the response message memory area 13a of the recording memory 13 at a high speed. Assume that the registration mode is set through an outside wire. In this case, the system controller 6 supplies a line switching signal to the line switching section 2 to supply a response message, supplied by the user through a public telephone connected to an outside wire and the line interface section 1, to the speech codec section 22. In addition, the system controller 6 performs control to code the response message supplied to the speech codec section 22 into response message data and supply it to the burst signal processing section 23. Subsequently, the system controller 6 performs control to write the response message data at a predetermined address in the response message memory area 13a of the recording memory 13 at a high speed in the same manner as in the case wherein the registration mode is set through the key input section 7. Assume that the registration mode is set through a portable unit. In this case, the system controller 6 performs control to cause response message data, supplied from the user to the burst signal processing section 23 via the portable unit, the antenna 26, the RF section 25, and the digital modem section 24, to pass through the descrambler 35 and write the data at a predetermined address in the response message memory area 13a of the recording memory 13.

Assume that the automatic answering/recording mode is set and a telephone call is received via an outside wire after a response message is actually registered in the registration mode. In this case, upon reception of a ringer detection signal from the line interface section 1, the system controller 6 immediately supplies a line connection signal to the line interface section 1 to perform line connection. At the same time, the system controller 6 controls the communication controller 21 to read out (reproduce) the response message data from the predetermined address in the response message memory area 13a of the recording memory 13 at a high speed, and perform expansion processing of the readout response message data through the second shift register 39 and the second P/S converter 40 of the burst signal processing section 23. Thereafter, the system controller 6 performs control to supply the response message data having undergone expansion processing to the speech codec section 22. At the same time, the system controller 6 supplies a line switching signal to the line switching section 2 to supply the message from the caller to the speech codec section 22 upon line connection. With this operation, the system controller 6 controls the communication controller 21 to cause the first shift register 31 and the first P/S converter 32 to compress speech signal data corresponding to five msec, supplied from the speech codec section 22 to the burst signal processing section 23, on the time axis. Thereafter, the system controller 6 performs control to write the compressed speech signal data in the reception message memory area 13b of in the recording memory 13 at a high speed.

That is, response message data is read out from the recording memory 13 at the timing at which expansion processing of reception speech data is performed by the second shift register 39 and the second P/S converter 40 to restore the data. On the other hand, speech signal data is written in the recording memory 13 at the timing at which compression processing of transmission speech data is performed by the first shift register 31 and the second shift register 39 to generate the data. In addition, expansion processing for restoration of reception speech data and compression processing for generation of transmission speech data are performed by using different time slots, and the timings of the expansion processing and the compression processing are different from each other (see FIG. 3). Consequently, the timing of reproduction of response message data and the timing of recording of speech signal data are also different from each other. Therefore, the simultaneous answering/recording operation can be performed by using the burst signal processing section 23 and one recording memory 13 of the digital cordless telephone apparatus. As a result, no special circuits for recording and reproducing a response message and a message from a caller are required.

An operation to be performed when the apparatus is set in the reproduction mode will be additionally described. Assume that the reproduction mode is set through the key input section 7 or an outside wire. In this case, the system controller 6 performs control to reproduce speech signal data in the same manner as in reproduction of response message data in the automatic answering/recording mode described above. In addition, if the reproduction mode is set through a portable unit, the system controller 6 supplies speech signal data read out from the recording memory 13 to the digital modem section 24 via the first shift register 31, the first P/S converter 32, and the scrambler 34. Subsequently, the system controller 6 performs control to supply the speech signal data to the portable unit via the RF section 25 and the antenna 26 with this operation, a speech signal in the automatic answering/recording mode is reproduced in the portable unit.

Another embodiment in which the arrangement of the present invention is applied to a portable unit of the digital cordless telephone apparatus will be described next.

Figure 4:
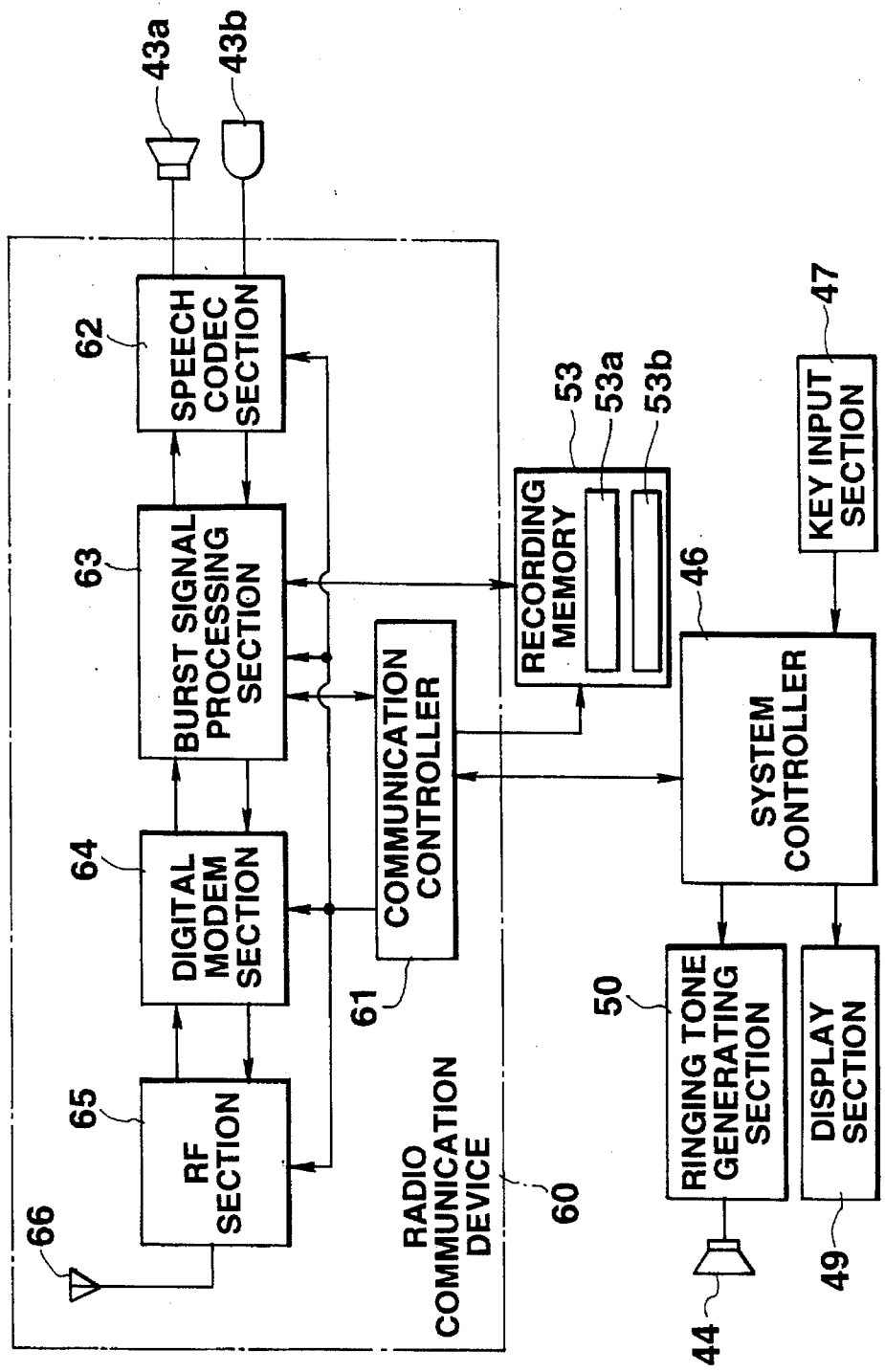
FIG. 4 is a block diagram showing the hardware arrangement of a portable unit of a digital cordless telephone apparatus according to the second embodiment of the present invention.

FIG. 4 is a block diagram showing the overall hardware arrangement of a portable unit of the digital cordless telephone apparatus according to the second embodiment to which the arrangement of the present invention is applied. As shown in FIG. 4, the portable unit of the digital cordless telephone apparatus of the second embodiment comprises a receiver loudspeaker 43a, a transmitter microphone 43b (corresponding to the handset described above), a loudspeaker 44, a system controller 46, a key input section 47, a display section 49, a recording memory 53, and a radio communication section 60 (a communication controller 61, a speech codec section 62, a burst signal processing section 63, a digital modem section 64, an RF section 65, and an antenna 66).

This portable unit of the digital cordless telephone apparatus has the radio communication section 60 having the same arrangement as that of the corresponding component of the base unit. One recording memory 53 for obtaining a recording/reproducing function is connected to the burst signal processing section 63. With this arrangement, a response message from the user, which is read out from a response message memory area 53a of the recording memory 53, is reproduced at the timing of the above-described compression processing for generating of transmission speech data. In addition, a speech signal generated by a caller is recorded on a reception message memory area 53b of the recording memory 53 at the timing of the above-described expansion processing for restoration of reception speech data. With this operation, as in the embodiment of the base unit, a simultaneous answering/recording operation can be performed without special circuits for recording and reproducing speech data.

Figure 5:
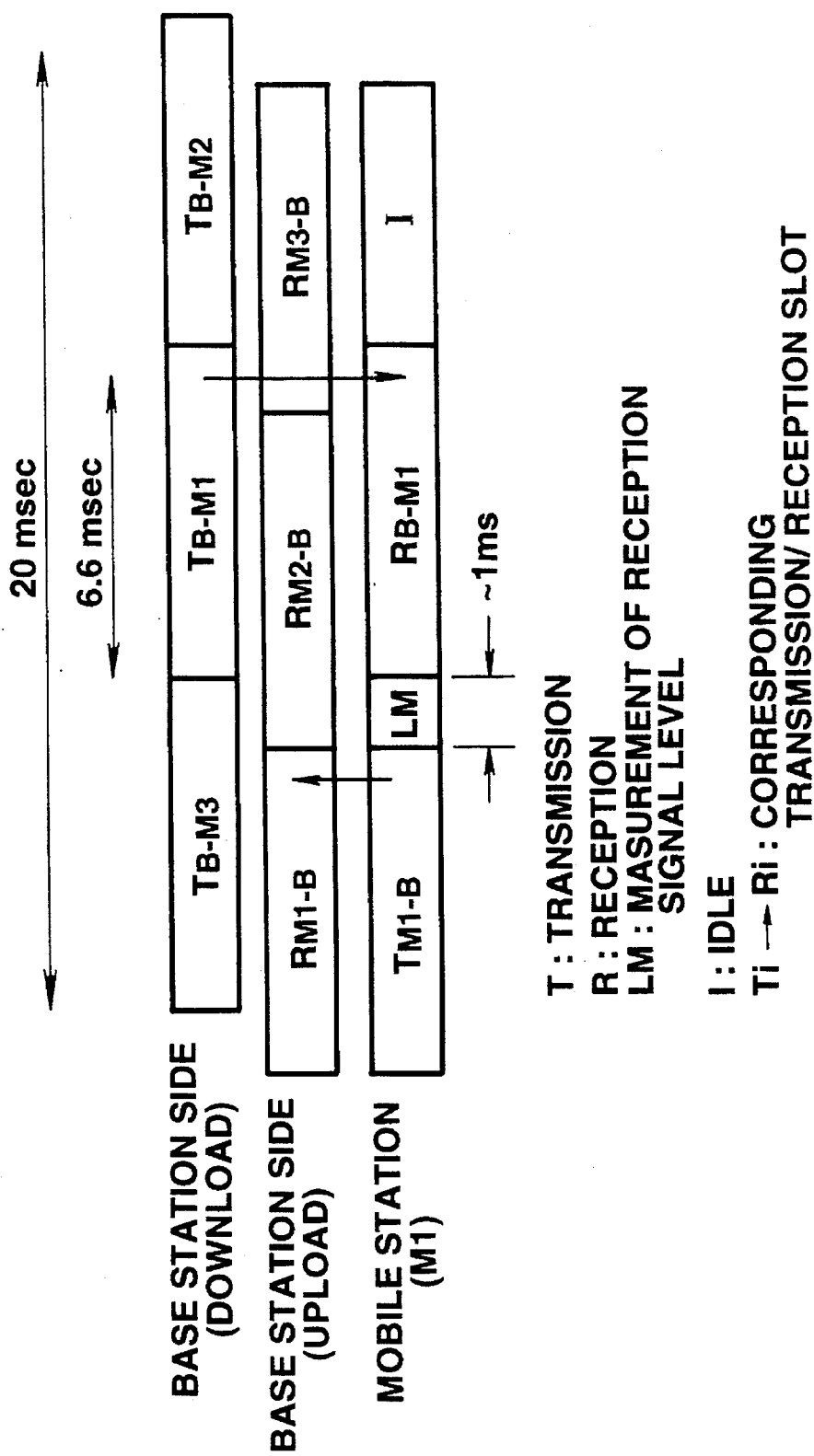
FIG. 5 is a chart showing the slot arrangement of a 3-channel TDMA/FDD scheme applied to a digital portable telephone apparatus.

FIG. 5 shows the slot arrangement of a 3-channel TDMA/FDD scheme (3-channel time-division multiple access/frequency-division multiplex scheme) applied to a digital portable telephone apparatus for mobile communication. As shown in FIG. 5, since the same type of TDMA scheme as the above digital cordless telephone apparatus is applied to the digital portable telephone apparatus (not shown), the reception timing for a carrier wave (slot $T_{B-M1}$→slot $R_{B-M1}$) supplied from a base station side (download) to a mobile station side (M1) is different from the transmission timing for a carrier wave (slot $T_{M1-B}$→slot $R_{M1-B}$) supplied from the mobile station side (M1) to the base station side (upload).

For this reason, one semiconductor IC memory (not shown) for obtaining a recording/reproducing function is connected to a burst signal processing section (not shown) of this digital portable telephone apparatus. With this arrangement, a response message from the user, which is read out from the semiconductor IC memory is reproduced at the carrier wave transmission timing corresponding to the timing of the above-described compression processing for generation of transmission speech data. In addition, a speech signal generated by a caller is recorded on the semiconductor IC memory at the carrier wave reception timing corresponding to the timing of the above-described expansion processing for restoration of reception speech data. With this operation, as in the embodiment of the base unit of the digital cordless telephone apparatus, the simultaneous answering/recording operation can be performed without special circuits for recording and reproducing speech data.

According to the present invention, reproduction of a response message and recording of a message from a caller are performed by the burst signal processing section of the digital radio telephone apparatus at different timings. Therefore, a simultaneous answering/recording operation can be performed without a circuit for reproducing a response message and a circuit for recording a message from a caller with this arrangement, a reduction in the size and cost of the apparatus can be realized.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A digital radio telephone apparatus having an automatic answering/recording function, which performs bidirectional speech transmission via a radio channel according to a digital scheme, comprising:

first converting means for converting an analog speech signal into a digital speech data;

speech data compressing means for temporally compressing the digital speech data obtained by said first converting means, and for then outputting the compressed digital speech data as a burst signal;

sending means for sending the digital speech data output as the burst signal to another digital radio telephone apparatus;

receiving means for receiving the digital speech data sent as the burst signal from said another digital radio telephone apparatus;

speech data expanding means for temporally expanding the digital speech data received by said receiving means, and for then outputting the expanded digital speech data;

second converting means for converting the digital speech data output by said speech data expanding means into an analog speech data; and a recording memory for storing a response message to a caller and a message from the caller, said recording memory being connected to a signal line which connects said speech data compressing means and said sending means, and to a signal line which connects said speech data expanding means and said receiving means.

2. A digital radio telephone apparatus comprising:

a line interface section connected to a telephone line;

first converting means for converting an analog speech signal input through said line interface section into a digital speech data;

speech data compressing means for temporally compressing the digital speech data obtained by said first converting means, and for outputting the compressed digital speech data as a burst signal;

sending means for performing a speech data sending operation for sending the digital speech data output as the burst signal from said speech data compressing means to a portable terminal;

receiving means for performing a speech data receiving operation for receiving the digital speech data sent as the burst signal from said portable terminal;

speech data expanding means for temporally expanding the digital speech data received by said receiving means, and for outputting the expanded digital speech data;

second converting means for converting the digital speech data output by said speech data expanding means into an analog speech signal, and for outputting the analog speech signal to said telephone line through said line interface section, and wherein the speech data sending operation of said sending means and the speech data receiving operation of said receiving means are carried out in a time divisional manner;

a recording memory for storing a response message to a caller and a message from the caller;

means for reading out the response message from said recording memory, and for supplying the response message to said speech data expanding means, so as to enable the response message to be converted into an analog speech signal by said second converting means, and the analog speech signal to be sent to the caller; and means for supplying the digital speech data temporally compressed by said speech data compressing means to said recording memory so as to enable the message from the caller, which is input through said line interface section, to be stored in said recording memory.

3. A digital radio telephone apparatus comprising:

a line interface section connected to a telephone line;

first converting means for converting an analog speech signal input from said telephone line through said line interface section into a digital speech data;

speech data compressing means for temporally compressing the digital speech data obtained by said first converting means, and for outputting the compressed digital speech data as a burst signal;

sending means for performing a speech data sending operation for sending the digital speech data output as the burst signal from said speech data compressing means to a portable terminal;

receiving means for performing a speech data receiving operation for receiving the digital speech data sent as the burst signal from said portable terminal;

speech data expanding means for temporally expanding the digital speech data received by said receiving means, and for outputting the expanded digital speech data;

second converting means for converting the digital speech data output by said speech data expanding means into an analog speech signal, and for outputting the analog speech signal to said telephone line through said line interface section, and wherein the speech data sending operation of said sending means and the speech data receiving operation of said receiving means are carried out in a time divisional manner;

a response message memory for storing a response message;

a recording memory for storing a message from a caller;

means for reading out the response message from said response message memory, and for supplying the response message to said speech data expanding means, so as to enable the response message to be converted into an analog speech signal, and the analog speech signal to be sent to the caller; and means for supplying the digital speech data temporally compressed by said speech data compressing means to said recording memory so as to enable the message from the caller to be stored in said recording memory.

* * * * *